Figure 1:
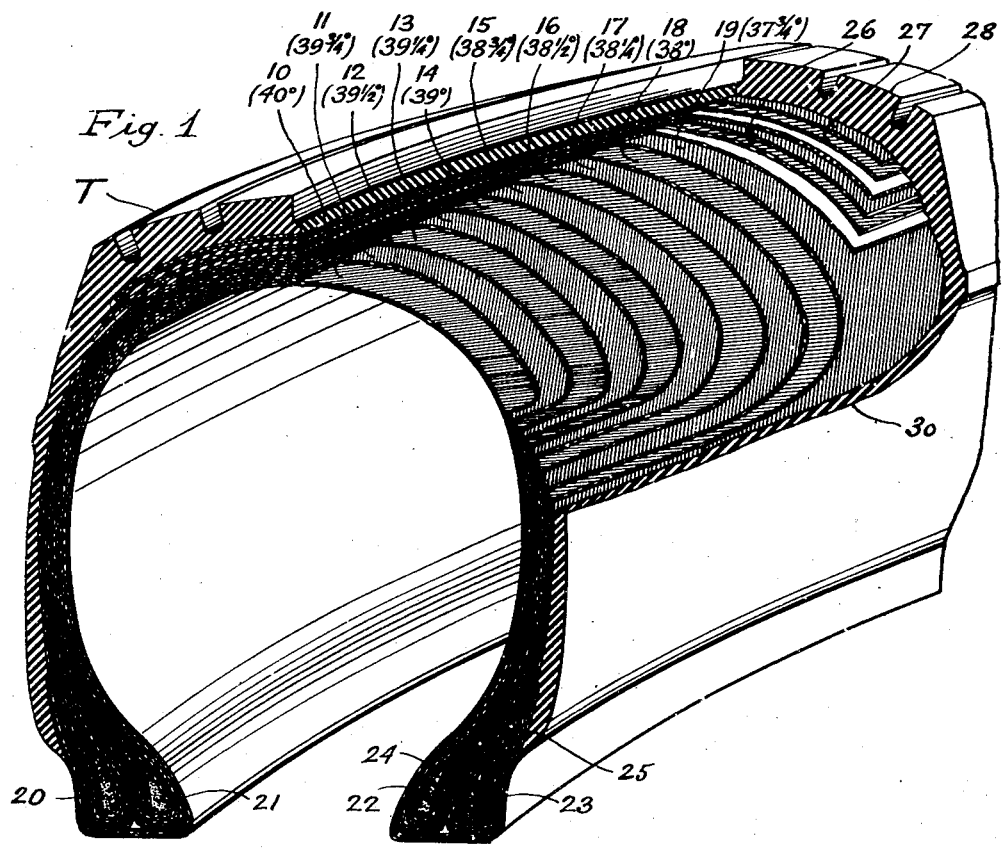

Dec. 16, 1947.    J. F. PURDY    2,432,630
PNEUMATIC TIRE
Filed Aug. 8, 1942    3 Sheets-Sheet 1

Inventor
John F. Purdy
Attorney

Dec. 16, 1947.  J. F. PURDY  2,432,630
PNEUMATIC TIRE
Filed Aug. 8, 1942   3 Sheets-Sheet 2
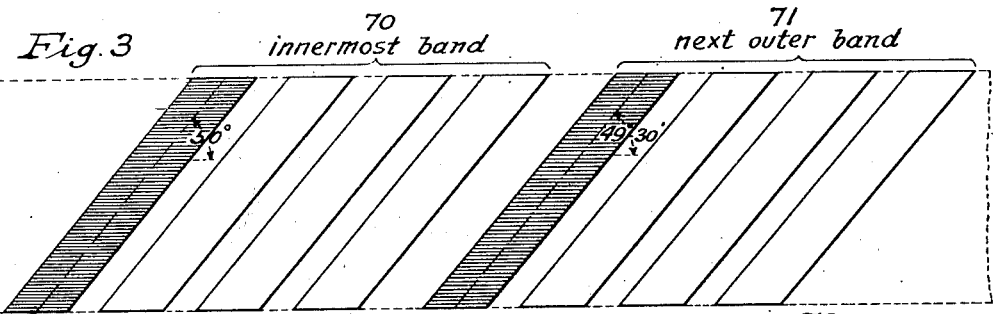
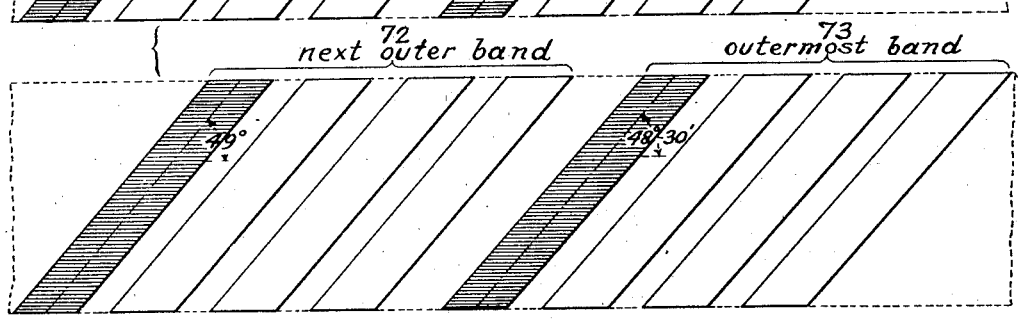
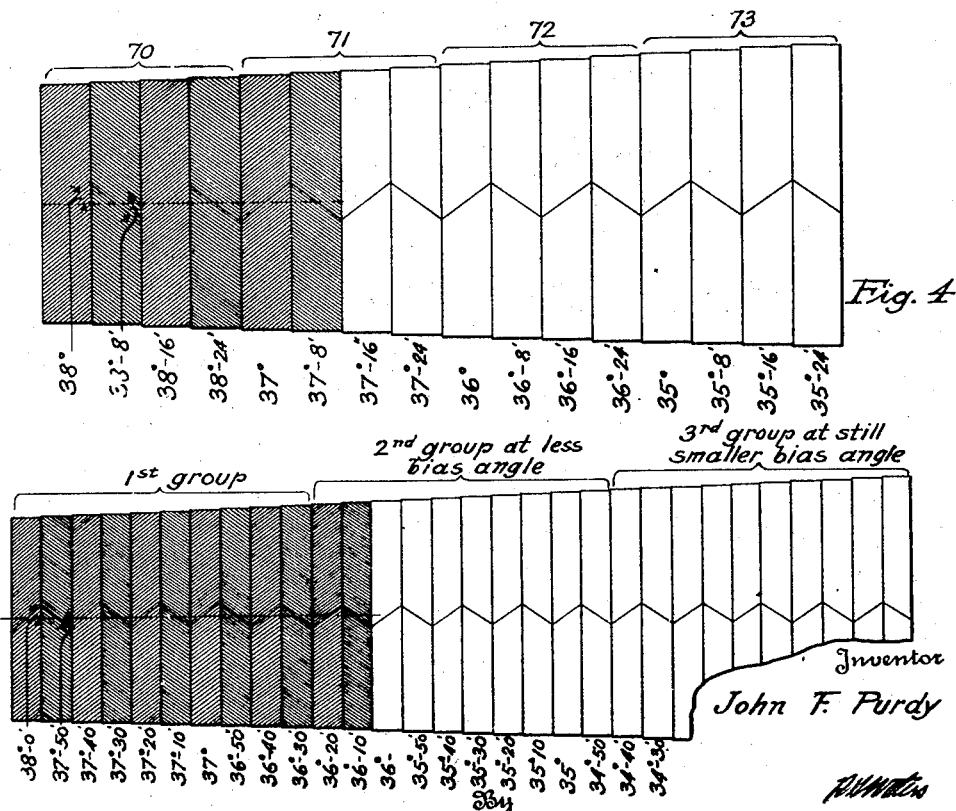

Dec. 16, 1947.  J. F. PURDY  2,432,630
PNEUMATIC TIRE
Filed Aug. 8, 1942  3 Sheets-Sheet 3

Inventor
John F. Purdy
By
Attorney

Patented Dec. 16, 1947

2,432,630

UNITED STATES PATENT OFFICE 2,432,630

PNEUMATIC TIRE

John F. Purdy, Akron, Ohio, assignor to Wingfoot Corporation, Wilmington, Del., a corporation of Delaware Application August 8, 1942, Serial No. 454,086

13 Claims. (Cl. 152—356)

This invention relates to pneumatic tires and methods of making the same, and, more particularly, is concerned with pneumatic tires including a plurality of rubberized cord fabric plies having the cords of all of the plies of the tire subjected to substantially uniform tension in use, and with methods of building the tires to achieve this result.

For many years it has been recognized that it is highly advisable to have uniform ply cooperation in a pneumatic tire. As early as 1904, Patent No. 778,496 was granted to A. H. Marks disclosing a tire carcass built up from a plurality of plies of fabric, and with the innermost ply cut on a bias angle of 45 degrees and each succeeding ply having a greater angle with respect to the great circle of the tire to thereby assertedly decrease elasticity of each succeeding ply and provide uniform stress in the several plies of the tire. Patents Nos. 1,374,505 and 1,493,674 to Ernest Hopkinson are also concerned with assertedly providing uniform ply cooperation throughout a pneumatic tire, and Hopkinson like Marks, taught the idea of increasing the angle between the cords and the great circle of the tire outwardly of the plies of the tire. Again, Elliot Patent No. 2,225,042 is concerned with the same problem of providing uniform loading of the cords of the various plies in a tire carcass and discloses and claims the idea of employing a plurality of groups of plies, each group having a pair of adjacent plies with cords running in the same direction and used in cooperation with a second pair of adjacent plies having parallel cords but extending in an opposite direction to the cords of the first set of plies.

Although there have been various suggestions, such as those above discussed, to overcome the problem of providing a pneumatic tire carcass having uniform ply cooperation, nevertheless it has been the standard practice in building a pneumatic tire to cut the cord fabric plies on the same bias angle. It is well understood that when the several plies of a pneumatic tire are cut on the same bias angle, but are superimposed one upon the other in the building of the tire the difference in diameter of the several plies, and the shaping of the tire from the drum or core built form to the vulcanized finished form provides a tire structure in which the angle between the cords of each ply and the great circle of the tire increases in each ply outwardly from the innermost ply. In other words, a tire carcass built from cord fabric cut on the same bias angle in the finished tire provides a structure similar to that of Marks and Hopkinson, namely, a structure in which the angle between the cords of each ply and the great circle of the tire increases radially outwardly of the tire.

I have discovered that prior art proposals to provide uniform tensioning of the various plies and cords in a pneumatic tire serve to accentuate rather than relieve the difficulty of non-uniformity and of stress concentration. Similarly, I have found that building a tire carcass on a drum from cord fabric plies cut on the same bias angle, but finishing up in the built and shaped tire at progressively greater angles outwardly of the plies and with respect to the great circle of the tire, accentuates the non-uniform loading of the various plies. Usually, as long as the number of plies in a tire carcass is kept to four, or at the most six, the standard practice of using the same bias angle on each one of the several plies in the carcass does not give rise to objectionably different stresses in the several plies of the tire carcass. Also, if cord fabric possessing relatively high stretch characteristics is employed the resiliency of the cords of the fabric of the several plies is sufficiently great so that objectionable non-uniformity of stress is not readily apparent in the tire carcass. However, when low stretch rubberized cord fabric is employed to build a tire carcass (and low stretch cord fabric is widely used today), or when a tire carcass is built up of a considerable plurality of plies, for example ten or more, in the manner which has become so common in recent years in the manufacture of large truck and other vehicle tires (certain large airplane and earth-mover tires include as many as thirty-two or more plies) then the problem of non-uniformity of ply loading becomes a very serious one and will result, when the tire is shaped from built to vulcanized form or when inflated, in a tire structure in which certain of the plies are so stressed that they will either break or pull out at the beads, and in which other plies of the tire are so free of stress that the cords therein may be without tension and may be wrinkled.

It is the general object of my invention to avoid and overcome the foregoing and other difficulties of and objections to known and suggested prior art practices for assertedly relieving non-uniformity of stress in the several plies of a tire carcass by the provision of a tire having a rubberized cord fabric ply carcass which in use will substantially uniformly tension all of the cords in all of the plies of the tire.

Another object of my invention is the provision of a pneumatic tire having uniform cooperation among the plies of the tire when inflated and in service, uniform pressure load on all plies, and a uniform distribution of shearing stresses among the plies.

Another object of my invention is the provision of a pneumatic tire made from a plurality of rubberized cord fabric plies, and with the cord angle and cord tension among all the plies being so closely controlled that in all cases a cord tension in the inflated tire may be obtained which is considered optimum for the particular fabric used in the tire, and so that no cord in the finished tire is either over-tensioned or under-tensioned but is doing substantially its full share and no more when the tire is operated for the purpose desired.

Another object of my invention is the provision of improved methods for producing a pneumatic tire having substantially uniform ply cooperation.

Another object of my invention is the provision of a pneumatic tire wherein the cord path of the cords of each ply is such that stresses due to loading and inflation pressure will be uniformly distributed among the various plies.

The foregoing objects of my invention, and other objects which will become apparent as the description proceeds, are achieved by the provision of a pneumatic tire including a plurality of rubberized cord fabric plies, and with the angle between the cords of each ply and the great circle of the tire being substantially greatest in the innermost ply and progressively less or periodically recurrently less in the radially outwardly positioned plies. Again, the principles of my invention may be achieved by a pneumatic tire casing comprising a carcass composed of a plurality of plies of rubberized cord fabric, the circumferential distance between the ends of any cord in an inner ply being less than the distance between the ends of any cord in any superimposed ply.

Or stated in terms of method, my invention includes correlating ply bias angles and/or ply pull-on stretches so that a substantially uniform cured tire cord angle gradient is provided in the built tire which results in uniform ply cooperation.

Figure 2:
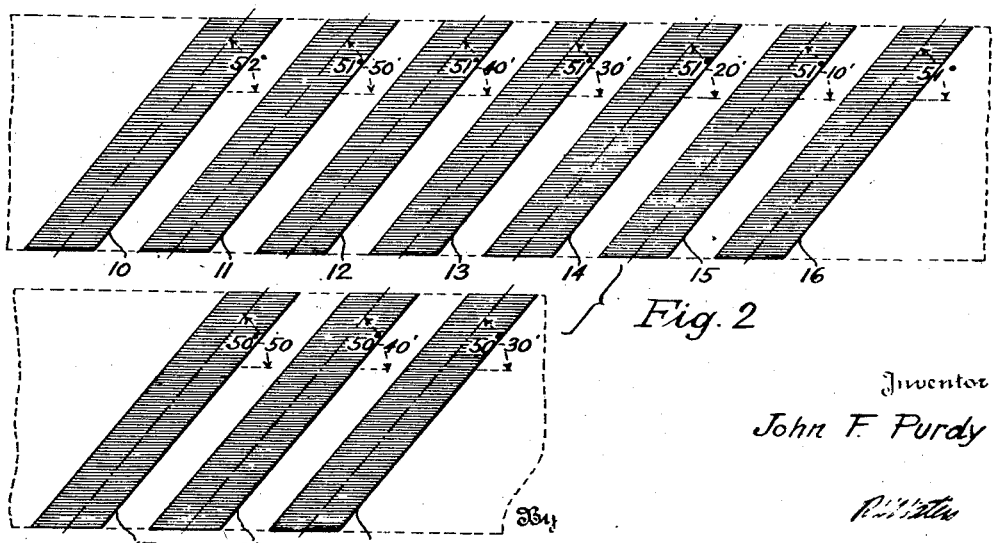
Figure 6:
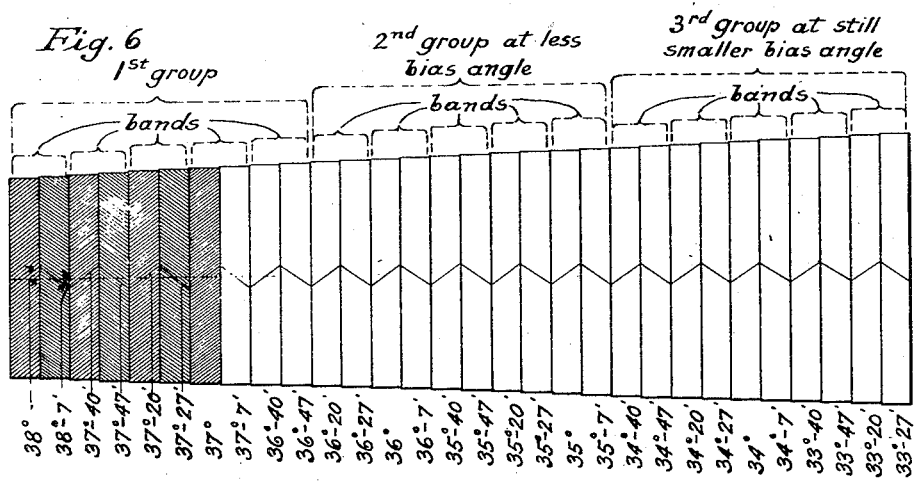
Figure 7:
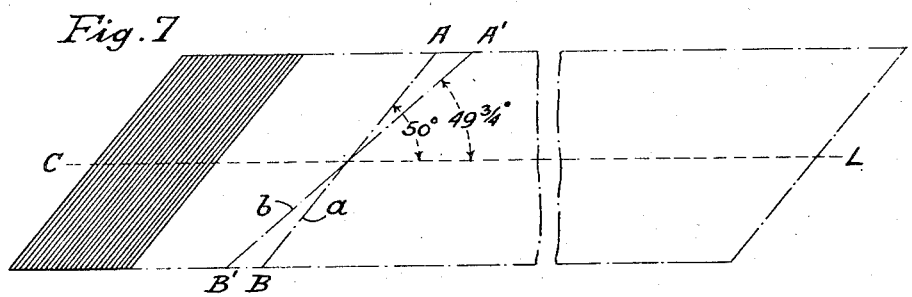
Figure 8:
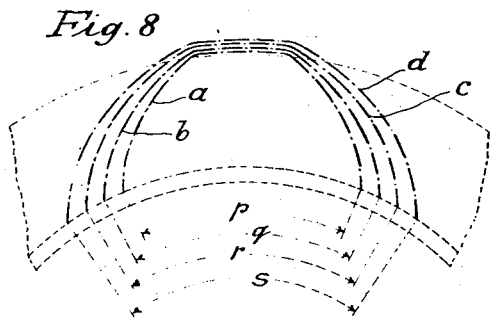

For a better understanding of my invention reference should be had to the accompanying drawings wherein Fig. 1 is a perspective view of a section of one embodiment of a pneumatic tire constructed in accordance with my invention, and with parts thereof being broken away in steps; Fig. 2 is a diagrammatic plan view of the manner in which the plies of rubberized cord fabric are cut from a length of cord fabric; Fig. 3 is a view similar to Fig. 2 but illustrating the manner of cutting a plurality of plies on the same angle to form a band, and cutting a plurality of other plies on a different angle to form an additional band or bands; Fig. 4 is a diagrammatic showing of a stepped down tire section built from the plies of Fig. 3; Figs. 5 and 6 are similar to Fig. 4 but illustrate other embodiments of my invention; Fig. 7 is a diagrammatic plan view of a ply of rubberized cord fabric illustrating the angle of the cords therein; and Fig. 8 is a diagrammatic side elevation of a section of a finished tire illustrating the position of the cords in the several plies thereof.

Referring to the drawings, the letter T indicates generally one form of a pneumatic tire constructed in accordance with the principles of my invention. Specifically, the tire T includes superimposed plies of rubberized cord fabric 10, 11, 12, 13, 14, 15, 16, 17, 18, and 19. The fabric of each ply may be of the well known weftless or pickless type having the load bearing cords all extending in one direction and with the individual cords being held together only by the rubber skim or friction coating. Again, the fabric of each ply may be of the well known type in which the load bearing cords, usually called warp cords, extending in the same direction are held together by light weight weft or pick threads at spaced points. Therefore, the term cord fabric as employed here and in the claims is intended to include either of the two fabric types just described, or modifications thereof. Usually each of the plies extends from edge to edge of the tire carcass and the side edges of the plies are positioned around inextensible bead portions 20, 21, 22, and 23 in the tire embodiment illustrated, and with bead flipper and chafer strips 24 and 25 being employed in known manner. Any usual breaker means 26 and 27 may be incorporated with the tire carcass on the periphery thereof, and the tire is provided with the usual tread portion 28 and rubber side walls 30.

Now in accordance with the principles of my invention each one of the plies 10 to 19 of the tire T is cut from a rubberized cord fabric strip at a progressively lesser bias angle (see Fig. 2) namely, ply 10 is cut at an angle of 52° between the cords and the center line of the ply, ply 11 at an angle of 51°—50', ply 12 at an angle of 51°—40', ply 13 at an angle of 51°—30', ply 14 at an angle of 51°—20', ply 15 at an angle of 51°—10', ply 16 at an angle of 51°, ply 17 at an angle of 50°—50', ply 18 at an angle of 50°—40', and ply 19 at an angle of 50°—30'. The result is that the angle between the cords of each ply in the cured tire and the great circle of the tire decreases radially outwardly of the several plies of the tire. More specifically, and referring to Fig. 1 of the drawings, ply 10 for a given tire, for example a 9.00 x 20 tire, has a cured tire cord angle, i. e. the angle between the cord and the median plane or great circle of the cured tire, of 40 degrees. Ply 11 has a somewhat lesser angle, for example an angle of 39¾ degrees, ply 12 has a still smaller angle, for example 39½ degrees, and plies 13 to 19 have angles of 39¼, 39, 38¾, 38½, 38¼, 38, and 37¾ degrees respectively. Thus, a tire structure is provided in which the cords of each ply have a less angle with the great circle of the tire in each radially outwardly positioned ply.

It should be particularly understood that it sometimes complicates the tire building operation to have every ply thereof cut at a different bias angle. Accordingly, I very often decrease the angle of the cord plies only at stepped points outwardly of the tire carcass, for example, I may make the first two plies from cord fabric cut at the same bias angle, the next two plies from cord fabric cut at a somewhat lesser bias angle, and so on throughout the tire. Again, I may make four or more plies of the tire from cord fabric cut at the same bias angle, the next four or more radially outwardly plies from cord fabric cut at a lesser bias angle, and so on throughout the tire.

Referring to Fig. 3 of the drawings, I have therein illustrated diagrammatically the arrangement of the plies of a sixteen ply tire, for example a 16.00 x 24 tire. The first four plies 70 of the tire, forming the innermost plies of the tire carcass, are cut from rubberized cord fabric on a bias angle of approximately 50 degrees. These first four plies are formed into a band, with adjacent plies of the band positioned with the cords extending at equal but opposite angles to the great circle of the tire in the same way that the plies are usually assembled in a standard tire building operation. I have found it convenient to form the band from the four plies in a separate building operation and to thereafter position the completed band on a tire building form where the complete band is handled substantially as a single ply, and in known manner.

The next four plies 71 of the tire are cut on a bias angle of approximately 49½ degrees, and these four plies are formed into an individual band which has been designated in the drawing as the next outer band and which is then built onto the tire carcass. The next four plies 72 are cut on a bias angle of approximately 49 degrees and are also formed into a band which is built onto the tire carcass. The last four plies 73 are cut on a bias angle of approximately 48½ degrees and are also formed into a band which is built onto the tire carcass in the usual way. It will be understood that in the finished tire carcass the several plies forming the same are usually positioned with the rubberized cords of every other ply extending in the same general direction and adjacent plies having the cords extending in opposite directions.

It will be recognized that when I decrease the angle between the ply cords and the great circle of the tire every two or four or more plies, as last described, the plies of the tire lying between the innermost ply of one band and the innermost ply of the next outer band may contain cords lying on an increased angle with the great circle of the tire. Although this is not desirable it is not highly objectionable and my compromise of reducing the angle for every band of two or more plies is a practical and workable expedient which can be adapted into production methods without undue bias cutting and fabric handling complications. For example, in the specific example of tire structure and bias angle change last given the cured tire cord angle of each ply from the innermost outwardly may be substantially: 38°, 38°—8′, 38°—16′, 38°—24′, 37°, 37°—8′, 37°—16′, 37°—24′, 36°, 36°—8′, 36°—16′, 36°—24′, 35°, 35°—8′, 35°—16′, 35°—24′. Fig. 4 diagrammatically illustrates this construction.

An important part of my invention is the provision of an improved method for building tires wherein and whereby I am able to control cured tire cord angles separate from, or in conjunction with, bias angle changes as heretofore described. Specifically, in the usual tire building operation wherein each ply in the tire is put on in turn, it has long been standard practice to wrap each ply in turn around the building form and tear off any surplus in the length of the ply. This results in a tire carcass in which before shaping each ply has its cords lying at substantially the same angle to the great circle of the carcass. This carcass, when shaped, has the cords of the several plies positioned at increased angles radially outwardly of the plies, as above described, and as disclosed and claimed in the prior art practices discussed. Now I have found that if the plies of the tire carcass are made up as separate bands of the same length, or preferably of successively shorter lengths, for example on a separate band building apparatus, and are then stretched circumferentially (and each band to a greater amount) in being applied to the tire building form I obtain a built tire carcass and a shaped tire carcass in which the angle between the cords of the several bands and the great circle of the tire decreases radially outwardly of the bands. In other words, by making the amount of pull-on stretch greater for each successive superimposed band, I am able to obtain substantially the same result which a decrease in bias angle produces.

Now when tires having a large number of plies are built, I have found it to be particularly advisable to use a combination of bias angle decrease and greater pull-on stretch in the plies. This is because of limitations in factory practice as to the amount of pull-on stretch which can be conveniently handled, and because of the importance of controlling the cord count in the cured tire. Also, this practice minimizes the number of changes of bias angle required in any tire. For example, in a thirty ply tire the first ten plies may be cut at the same bias angle and made into bands of the same length or successively shorter lengths and of two or more plies. Then successive bands are built onto the building form each with progressively greater pull-on stretch so that after the tire is shaped the desired cured tire cord angle decrease or gradient is obtained in the vulcanized tire to give substantially uniform ply cooperation.

The ten plies of the second group are cut on a smaller bias angle than the plies of the first group and made into bands of two or more plies and of the same length or successively shorter lengths. Then the successive bands are built onto the building form, each with progressively greater pull-on stretch so that the cured tire cord angle gradient decrease outwardly of the bands will be substantially the same as and a continuation of the gradient decrease of the first ten plies. The ten plies forming the third and last group are cut on a still smaller bias angle than the second group and the band forming and progressively greater pull-on stretch is repeated so that the vulcanized tire has a cured tire cord angle lying on a substantially uniform gradient from larger to smaller angles counting outwardly among the bands.

In the tire structure just described the cured tire cord angles using one ply bands may be respectively from the innermost ply outwardly approximately 38°, 37°—50′, 37°—40′, 37°—30′, 37°—20′, 37°—10′, 37°, 36°—50′, 36°—40′, 36°—30′, 36°—20′, 36°—10′, 36°, 35°—50′, 35°—40′, 35°—30′, 35°—20′, 35°—10′, 35°, 34°—50′, 34°—40′, 34°—30′, 34°—20′, 34°—10′, 34°, 33°—50′, 33°—40′, 33°—30′, 33°—20′, 33°—10′. Fig. 5 illustrates diagrammatically such a tire construction, and wherein a substantially uniform reduction gradient in cured tire cord angle is achieved throughout the tire outwardly of the plies by a combination of bias angle change plus progressively greater pull-on stretch. When using two ply bands in the process just described the cured tire cord angles counting outwardly among the plies may be approximately as follows: 38°, 38°—7′, 37°—40′, 37°—47′, 37°—20′, 37°—27′, 37°, 37°—7′, 36°—40′, 36°—47′, 36°—20′, 36°—27′, 36°, 36°—7′, 35°—40′, 35°—47′, 35°—20′, 35°—27′, 35°, 35°—7′, 34°—40′, 34°—47′, 34°—20′, 34°—27′, 34°, 34°—7′, 33°—40′, 33°—47′, 33°—20′, and 33°—27′. This construction is illustrated diagrammatically in Fig. 6.

The same reduction gradient illustrated in Fig. 5 can be obtained, as above explained, solely by bias angle change in each ply, or the same reduction gradient can be obtained solely by progressively greater pull-on stretch. In conjunction with the use of progressively greater pull-on stretch alone or in combination with bias angle change, I preferably, but not necessarily, employ mechanical or other stretching means to pre-stretch the band before it goes to the tire builder so that the pull-on stretch in the building operation will be kept uniform for the convenience of the tire builder. However, it should be noted that too great pull-on stretches should be avoided because of the tendency to change the cord count per inch thereby.

It would be well to note here the sharp distinction that should be drawn at all times between bias angle (namely the angle between the ply cords and the center line of the ply as cut) and cured tire cord angle (above defined). It is true that these angles bear a distinct relation to each other and means are known for determining the one from the other. In Fig. 7 I have diagrammatically shown a ply of rubberized cord fabric cut on a bias, with the bias angle between a given cord AB in the ply and the center line CL of the ply being 50 degrees. This ply will be, for example, the innermost ply in a tire carcass. The next radially outer or superimposed ply will be cut on a smaller bias angle, for example, the position of the rubberized cord in the second ply of fabric is indicated by the line A'B' and the angle is an angle of say 49¾ degrees.

When the ply fabric illustrated in Fig. 7 is applied to a tire building form and is built into a tire, which is subsequently shaped to toric form and vulcanized therein, the cord will take substantially the position illustrated in Fig. 8 of the drawings by the dot and dash line indicated by the letter $a$, and the circumferential distance between the ends of the cord becomes a distance $p$ at the points of the tie-in of the cord with the beads of the tire. A cord $b$ in the next outward or superimposed ply of fabric, cut on a smaller bias angle as described in the next proceeding paragraph, will take substantially the position shown in Fig. 8 of the drawings, and the distance between the ends of the cord $b$ at the bead tie-in is substantially a distance $q$. A cord $c$ in the next radially outward ply of fabric, cut on a still smaller bias angle, takes the position shown in Fig. 8, and the circumferential distance between the ends of the cord $c$ at the point of bead tie-in becomes a distance $r$. A cord $d$ in the next outer ply, cut on a still smaller bias angle takes a position as illustrated in Fig. 8, and the circumferential distance between the ends of the cord $d$ at the region of the bead tie-in becomes a distance $s$. It will be seen that $s$ is greater than $r$, $r$ is greater than $q$, and $q$ is greater than $p$, so that, in describing my advance in the art, I may say that the circumferential distance between the bead tie-in of the rubberized cords in the several plies in a tire constructed in accordance with my invention increases radially outwardly of the plies of the tire, with the change being made in each ply or every two or more plies in successively outwardly positioned plies. And this is true whether the cord angle change is due to a progressive decrease in bias angle in the plies, due to a progressively greater pull-on stretch in the plies, or due to a combination thereof.

By way of an example of bias angle changes to achieve the objects of my invention, when building a tire of a size 24.00 x 32 and of thirty-two ply construction, the first band of four plies may have a bias angle of 60 degrees, the second band of four plies a bias angle of 59½ degrees, and succeeding bands, each of four plies, may have bias angles of 59, 58½, 58, 57½, 57, and 56½ degrees respectively.

A specific commercial application of the principles of my invention entailing a minimum of production complications comprises building a 24.00 x 32 tire of thirty-six ply construction and wherein the first eighteen plies are cut on a bias angle of 62½ degrees and made into two-ply bands of the same length, namely 133.12 inches. Thus, each of the two-ply bands will be applied with greater pull-on stretch. The last eighteen plies are cut on a bias angle of 60 degrees and made into two-ply bands of the same length, namely 142.4 inches. Each of the last nine two-ply bands are applied with greater pull-on stretch.

Again, in a commercial embodiment of a 16.00 x 24 tire of twenty plies, the first ten plies may be cut on a bias angle of 57½ degrees. The plies are built into two-ply bands, with the first three bands being made of the same length, namely 109 inches long, and applied with progressively greater pull-on stretch. The next two bands are made 108 inches long, and are applied with greater pull-on stretch. The next ten plies are cut on a bias angle of 55 degrees and made into two ply bands. The first two bands are made of the same length, namely 114 inches, and are applied with progressively greater pull-on stretch. The last three bands are made of a shorter length, namely 113 inches, and are applied with progressively greater pull-on stretch.

So far as the exact cured tire cord angle is concerned, I have found that if the cured tire cord angle for the innermost ply of any given tire is selected in accordance with past experience or by any known methods, then the cured tire cord angle for each super-imposed ply should be between about 5 and about 25 minutes less than the cured tire cord angle of the next inner ply, and usually about 10 or 12 minutes less. On occasions I have found it advisable to provide somewhat greater cord angle changes or gradients between plies, for example, up to 40' or slightly more for specialized constructions that may sometimes be required to be built, for the time being, on standard building forms. With heavy plies the angle may be decreased closer to 25 minutes and with thin plies closer to 5 minutes, although ply thickness alone does not determine the pressure gradient. The most important criterion is surface curvature, and when the surface curvature of the tire carcass is small the gradient is usually nearer to 5', and when the surface curvature is large the gradient is usually nearer to 25'. Surface curvature is defined as the reciprocal of the radius of curvature of the cord path or 1 divided by the radius. Cured tire cord angle changes within the indicated limits have been proven to give much more uniform ply cooperation and uniform cord loading over a wide range of tire sizes than has been achieved prior to my invention.

Or in terms of bias angle change, I have found that if the bias angle for the innermost ply is selected in accordance with past experience or by any known methods, then the bias angle for each superimposed ply should be between about 2 and about 15 minutes, and in extreme cases up to 30', less than the bias angle of the next inner ply. With heavy plies or large surface curvatures the angle may be closer to 15 minutes, and with thin plies or small surface curvatures closer to 2 minutes. Of course, when, because of production limitations, the bias angles of the various plies are advisably changed as groups or as bands, as above described, the change of bias angle in each band will be approximately the number of plies in the band times the decrease in angle for each ply as set forth in this paragraph.

It should be noted here that I am not more specific except in the examples given, as to the cured tire cord angle or the bias angle of the innermost ply, because my invention of uniform ply cooperation is not limited to any specific value or range of the cured tire cord angle or to the bias angle of the innermost ply. A completed tire embodying the principles of my invention may have an innermost ply of any cord angle from large to small. In this respect it is old and well known that in some tires it is advisable to have a low cured tire cord angle, i. e. angles down to 25 degrees or less, for example, to get a tire of low profile. Again, by keeping the cured tire cord angle high, i. e. up to 60 degrees or more, a tire of a different cross sectional contour is produced. The choice of representative or average angle in the tire is made from consideration of the service the tire is required to perform. But in any event, and regardless of the service requirements which determine the cured tire cord angle of the innermost ply, my invention is concerned with controlling and adjusting the cured tire cord angles along a gradient about any mean or starting value such that substantial uniformity of tension will be obtained in all plies.

Further, it should be noted that the "blow-up" of the tire from the shape in which it is built to the shape in which it is vulcanized and used has an important bearing on cord tension and position. However, the objects of my invention are achieved as herein described as long as the relative lengths of the cords of the various plies are substantially the same on the building drum or core as the relative lengths of the cords of the various plies in the vulcanized tire. Experience has indicated proper core or drum construction for most of the standard tire sizes, and with the last above statement in mind proper core design for other tire sizes is not difficult, and from cores or drums available that one best suited to a given building operation can be selected.

The term "band" as employed in the claims is intended to include one or more plies, and the term "cord angle" is intended to mean the cured tire cord angle as above explained.

I have found that when pneumatic tires are built in accordance with the principles herein disclosed the tension developed in the cords during the shaping of the tires from the building shape to the molded shape is substantially uniform, the amount of such tension being governed largely by the characteristics of the fabric used. Further, I have found that when a tire constructed in accordance with this invention is inflated and used each of the various plies in the tire is subjected to substantially uniform stress and is loaded so that each cord therein is subjected to substantially the same tension as any cord in any other ply of the tire. Accordingly, the tire can be constructed with the smallest number of plies to possess a given safety factor in any particular operation, and with each ply throughout the tire being uniformly stressed neither too high nor too low. The invention is particularly adapted to the manufacture of pneumatic tires having a very considerable plurality of plies and built from low stretch fabric.

It should be clearly recognized that the various examples of my invention which I have specifically set forth above are to the best of my knowledge and belief proper and reasonably accurate; nevertheless in actual practice it is often very difficult to obtain in the cured tire an exact response to the theoretical angles desired or seemingly indicated by bias angles changes. In other words, the cured tire cord angles may not in certain instances exactly follow the desired gradient pattern and this is due to factors which cannot be completely controlled, such as uneven fabric stretch, small angle changes, temperature variations, non-uniformity or variations in cord material, and other factors. The important thing is that a definite gradient trend is established in the direction described and set forth in detail above.

The term "cord angle" as employed in the specification and claims is intended to define the angle between the cords of a ply and the great circle of the tire lying in a plane normal to the axis of rotation of the tire. Further, the words "superimposed ply" or "superimposed band" utilized in the specification and claims are intended to mean a ply, plies, a band, or bands which are radially outside of previously recited ply, plies, band, or bands with or without being in direct contact therewith. In other words, the principles of the invention are not to be defeated or avoided merely by interposing a breaker strip or false ply or plies in the construction of a tire while following the basic teaching of this disclosure.

It will be understood that the term "cord fabric" as utilized in the specification and claims is intended to include weftless fabric, or thin and spaced weft cord fabric of conventional design, utilized in pneumatic tire construction, and the term "rubberized" is to include natural or synthetic rubbers or plastics capable of use in pneumatic tire construction.

Therefore, the various specific tire examples, bias angles and cured tire cord angles shown in the drawings and above described are by way of illustration only of the principles of my invention, and it should be particularly understood that I am not to be limited thereto or thereby, but that the scope of my invention is defined in the appended claims.

I claim:

1. A pneumatic tire including a plurality of rubberized cord fabric plies, and with the cord angle with the great circle of the tire of the innermost ply being greatest, and with the cord angle with the great circle of the tire being less in each superimposed ply.

2. A pneumatic tire including a plurality of rubberized cord fabric plies, and with the angle between the cords of each ply and the great circle of the tire being greatest adjacent the innermost ply and progressively less and less at outwardly stepped points in the plies.

3. A toric-shaped tire casing comprising a carcass composed of a plurality of plies of rubberized cord fabric, the circumferential distance between the ends of any cord in the innermost ply being less than the distance between the ends of any cord in the superimposed plies.

4. An unshaped, drum built pneumatic tire carcass composed of a plurality of bands or rubberized cord fabric, a plurality of plies of fabric forming each band, the innermost band being formed of plies having cords making an angle with the great circle of the tire greater than any other band, and each superimposed band being formed of plies having cords forming an angle with the great circle of the tire less than the angle of the plies of the band it surrounds, the decrease in angle between bands being substantially equal to the product of the number of plies in the band multiplied by between about 2 minutes and about 30 minutes.

5. A pneumatic tire including a carcass composed of a plurality of bands of rubberized cord fabric, the innermost band having cord angles between its cords and the great circle of the tire greater than any other band, and each superimposed band having cord angles less than the cord angles of the band it surrounds, the decrease in cord angle between bands being substantially equal to the product of the number of plies in the band multiplied by between about 5 minutes and about 40 minutes.

6. A pneumatic tire including a carcass composed of a plurality of bands of rubberized cord fabric, the innermost band having cord angles between its cords and the great circle of the tire greater than any other band, and each superimposed band having cord angles less than the cord angles of the band it surrounds.

7. A pneumatic tire including a carcass composed of a plurality of bands of rubberized cord fabric, the innermost band having a cord angle between its cords and the great circle of the tire greater than any other band, and each superimposed band having a cord angle less than the cord angle of the band it surrounds, the decrease in cord angle between bands being substantially equal to the product of the number of plies in the band multiplied by about 10 minutes.

8. A vulcanized toric-shaped tire casing including a carcass composed of a plurality of bands of rubberized cord fabric, the circumferential distance between the ends of any cord in any band being greater than the distance between the ends of any cord in substantially any radially inner band.

9. A vulcanized pneumatic tire including a carcass portion formed from a plurality of plies of rubberized fabric, the innermost ply having a cord angle between its cords and the great circle of the tire of between about 30 and about 60 degrees, the next several superimposed plies having successively greater cord angles, the next superimposed ply having a cord angle smaller than the cord angle of the innermost ply, and the next several plies having successively greater cord angles but less than the cord angle of the innermost ply.

10. A pneumatic tire including a carcass portion formed of a plurality of plies of rubberized cord fabric, a given ply having a cord angle between its cords and the great circle of the tire of between about 30 and about 60 degrees, a second ply superimposed over the given ply and having a greater cord angle than the given ply, a third superimposed ply having a less cord angle than the first ply, and a fourth superimposed ply having a greater cord angle than the third.

11. A vulcanized pneumatic tire including a carcass portion formed from a plurality of bands of rubberized cord fabric, each band having a plurality of plies, the angle between the cords of the plies and the great circle of the tire in each superimposed band being less than the cord angles of the plies in the band it surrounds, and the cord angles in the plurality of plies of any band being smallest in the innermost ply and increasing in each superimposed ply.

12. A pneumatic tire having a carcass consisting of a plurality of fabric plies, at least a majority of the plies having cords which make an angle with the great circle of the tire which decreases outwardly of the plies.

13. A pneumatic tire having a carcass consisting of a plurality of fabric plies, at least a majority of the plies having cords which make an angle with the great circle of the tire which decreases outwardly of the plies, and at least a majority of the plies adjacent to each other being positioned so that their cords are directed at opposite angles.

JOHN F. PURDY.

REFERENCES CITED

The following references are of record in the file of this patent:

UNITED STATES PATENTS

| Number | Name | Date |
|---|---|---|
| 1,428,040 | Kratz | Sept. 5, 1922 |
| 1,493,674 | Hopkinson | May 13, 1924 |
| 1,422,046 | Fording | July 4, 1922 |
| 1,454,469 | Dickinson | May 8, 1923 |
| 778,495 | Marks | Dec. 27, 1904 |
| 790,906 | Marks | May 30, 1905 |
| 1,579,817 | Keith | Apr. 6, 1926 |
| 790,907 | Marks | May 30, 1905 |
| 1,210,434 | Denman | Jan. 2, 1917 |